DATA DETECTION SYSTEM FOR REPRODUCING MAGNETIC BINARY INFORMATION
Filed May 31, 1962 3 Sheets-Sheet 1
FIG. 1
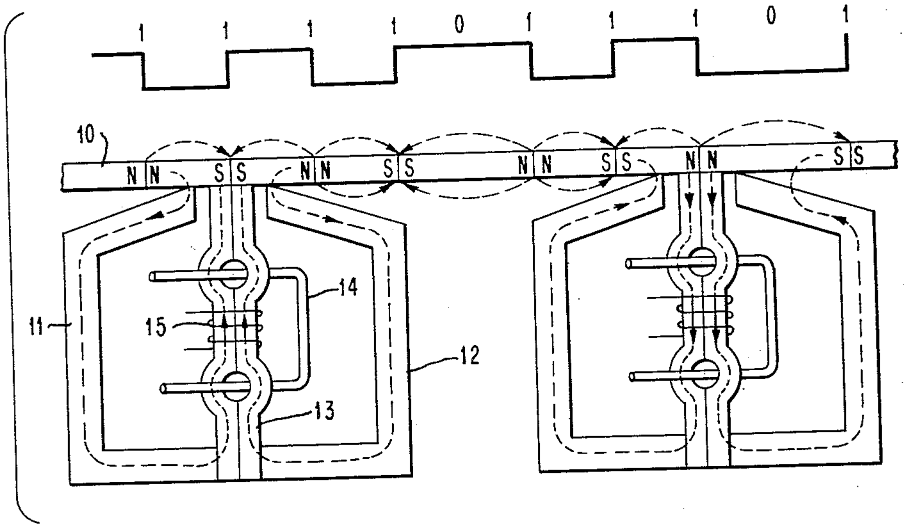
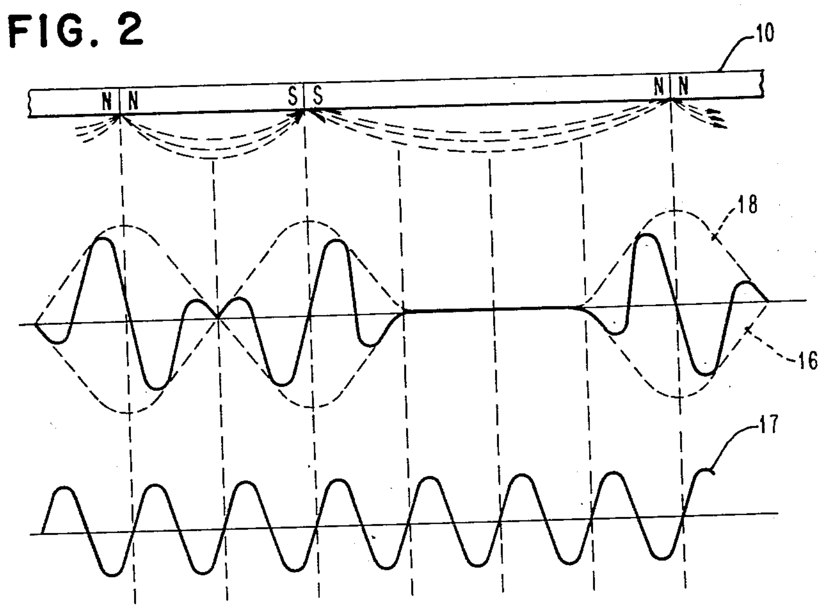
INVENTORS
ERNEST G. NEWMAN
DAVID CHANG
LAWRENCE A. TATE
BY
ATTORNEY Sept. 22, 1964 E. G. NEWMAN ETAL 3,150,358

DATA DETECTION SYSTEM FOR REPRODUCING MAGNETIC BINARY INFORMATION

Filed May 31, 1962 3 Sheets-Sheet 2

United States Patent Office 3,150,358
Patented Sept. 22, 1964

3,150,358

DATA DETECTION SYSTEM FOR REPRODUCING MAGNETIC BINARY INFORMATION

Ernest G. Newman, David Chang, and Lawrence A. Tate, Poughkeepsie, N.Y., assignors to International Business Machines Corporation, New York, N.Y., a corporation of New York Filed May 31, 1962, Ser. No. 198,799
8 Claims. (Cl. 340—174.1)

This invention relates to a data detection system and more particularly to the reproduction of binary information magnetically recorded as a sequence of transitions from one magnetic polarity to the opposite magnetic polarity along the length of a record medium.

Magnetic tapes have long been used for the purpose of storing large quantities of binary information. A plurality of tracks are usually provided with an associated reproducing head having a like plurality of tracks for the purpose of reproducing from the tape a plurality of binary bits to make up a single binary character. Binary 1's and 0's in a particular track along the tape are represented by a recording technique called non-return to zero (NRZ or NRZI). In either NRZ or NRZI types of magnetic recording, the binary information is represented by a transition of the magnetic flux emanating from the tape from one polarity to the opposite polarity. The tape therefore in a particular track appears as a series of magnets with each transition being a point where like poles of the magnets are adjacent to one another. The reproducing head used to interpret the magnetic information utilizes the flux emanating from the tape in the form of fringe flux which passes from one pole to the opposite pole of each of the magnets.

Reproducing systems interpret the fringe magnetic flux by looking at either the horizontal or the vertical component of flux in relation to the tape. In most reproducing systems however, there must be relative motion between the tape and reproducing head to cause a change in flux threading through the reproducing head. The change in flux detected by the magnetic head and its associated signal winding produces an electrical signal representative of the change. In most prior art systems, the magnetic tape is caused to be moved past a reproducing head at a constant rate of speed. If the speed is held constant, it is possible to predict with great accuracy the rate at which characters will be read from the tape. This rate is a controlling factor as to identification of binary information and further dictates the speed at which a utilizing device for the information must operate. Most utilizing devices operate on characters at a lower speed than that of the magnetic tape, such that a buffer must be provided to accumulate characters at the tape speed rate and present the characters to a utilization device at a slower rate of speed.

There is some prior art literature which has described a magnetic reproducing system wherein a dependence upon relative motion between the magnetic medium and the reproducing head is not required. These systems detect magnetic information in a reproducing head by exciting the reproducing head with an alternating current source which is effective to periodically change the reluctance of the magnetic path through the head. A steady state magnetic flux emanating from a magnetic record will be modulated by the alternating current excitations such that an output signal winding on the reproducing head will see a varying flux to thereby produce an output signal. The output signal will have a frequency and amplitude dependent upon the frequency of the excitation signal and the magnitude of magnetic flux threading the reproducing head from the magnetic tape.

A desirable feature in a tape storage device would be the ability to reproduce characters from the tape at a rate dictated by a utilization device. When magnetic tape is recorded with binary information in the normal fashion, that is with a continuously running high-speed tape machine, the physical spacing between binary bits and therefore binary characters is substantially uniform. At least one tape system has been developed wherein magnetically recorded tape is caused to be periodically stepped past a reproducing head, a distance substantially equal to the spacing between binary bits or characters. The instant at which the tape device is called upon to read the character is not dictated by the tape device itself but by the utilization device which calls for a character from the tape unit.

Certain problems are encountered in utilizing such an incrementing tape transport during reproduction. All tape devices experience a mechanical and electrical problem known as "skew." This is a problem which results in recording or reproducing all the binary bits of a particular binary character across the width of the tape. Because of wobble of the tape or misalignment of a recording or reproducing head, all of the binary bits of a particular character may not be read from the tape simultaneously as desired. In a constant speed, continuously running tape reproducing system, with uniform spacing of characters, an accurate prediction can be made as to when all of the binary bits of a particular character have been read. In this type of situation, a "character gate" is usually initiated on detecting the first binary bit of a character. The duration of the character gate is set at a predetermined value predictable from the tape speed, which indicates when all of the binary bits of a particular character should have been read. In the incrementing tape transport as described above however, there is not time relationship recognizable by the reproducing system. The tape may be caused to be stepped and stopped in such a maner that no characters, one character or possibly two characters may be read during a single incrementing step. Means other than a predetermined duration character gate must be provided.

Another problem encountered with an incrementing tape transport not encountered in a continuously running transport is a problem of "overshoot." Because of the inertia of mechanical parts and the tape itself during an incrementing operation, the magnetic tape may be stepped past the reproducing head a distance greater than the uniform distance between characters. The mechanical drive for the magnetic tape may also be such that the tape is caused to be stepped past the desired distance and then will be caused to be moved back a predetermined distance to a detent point which is a distance equal to the uniform distance between characters. In other words the tape may be stepped a distance greater than the uniform distance, but will fall back and detent at a point equal to the uniform distance. Reading a particular bit of a single character may give rise to several possibilities. In a single incrementing step there may be no bit read, a bit may be read as a new bit of a new character, it may be an old bit or a bit already read for a particular character, it may be a new bit of a character already partially read or it is possible that a single incrementing step will cause a particular track to read two successive binary bits.

It is therefore an object of this invention to provide a data detection system wherein magnetic information may be reproduced from a tape unit which increments the tape past a reproducing head.

It is an additional object of the invention to provide a data detection system for reproducing magnetic binary information which utilizes the phase and amplitude of a modulated output signal produced as a result of exciting the reproducing head with a high frequency signal.

It is a further object of this invention to provide a data detection system which reproduces magnetically recorded multi-bit binary characters in an incrementing tape transport which can:

Indicate when all of the bits for a particular character have been read;

Indicate when a new bit of a character is being read;

Indicate when a binary bit for a particular character is being read for the second time;

Indicate when a new bit of a partially read character is being detected;

Indicate when a bit has been missed and not reproduced.

These and other objects are obtained in a preferred embodiment of the invention wherein magnetically recorded binary information in the form of non-return to zero type of recording is incremented past a transducer. An excitation current is applied to the transducer which produces an outut electrical signal in the form of a carrier wave signal which is an amplitude modulated high-frequency signal having one of two opposite phases with respect to the excitation source. The two opposite phases are achieved as a result of the direction of magnetization of the tape on either side of a polarity transition which represents the binary information. Means are provided for detecting which of the two opposite phases is present, and for developing a control pulse dependent upon the amplitude of the modulated carrier wave signal. Binary information is entered into an output device whenever a change in phase of the output signal is detected. The output device is cleared of information upon the generation of the next control pulse except when the control pulse is generated after detecting that the phase of the output signal from the head has not changed.

The foregoing and other objects, features and advantages of the invention will be apparent from the following more particular description of a preferred embodiment of the invention, as illustrated in the accompanying drawings.

In the drawings:

FIGURE 1 is a representation of a static sensing reproducing head in various cooperative relationships with an NRZI magnetically recorded tape;

FIGURE 2 is a representation of the outlet signal waveform from the head of FIGURE 1;

Figure 3:
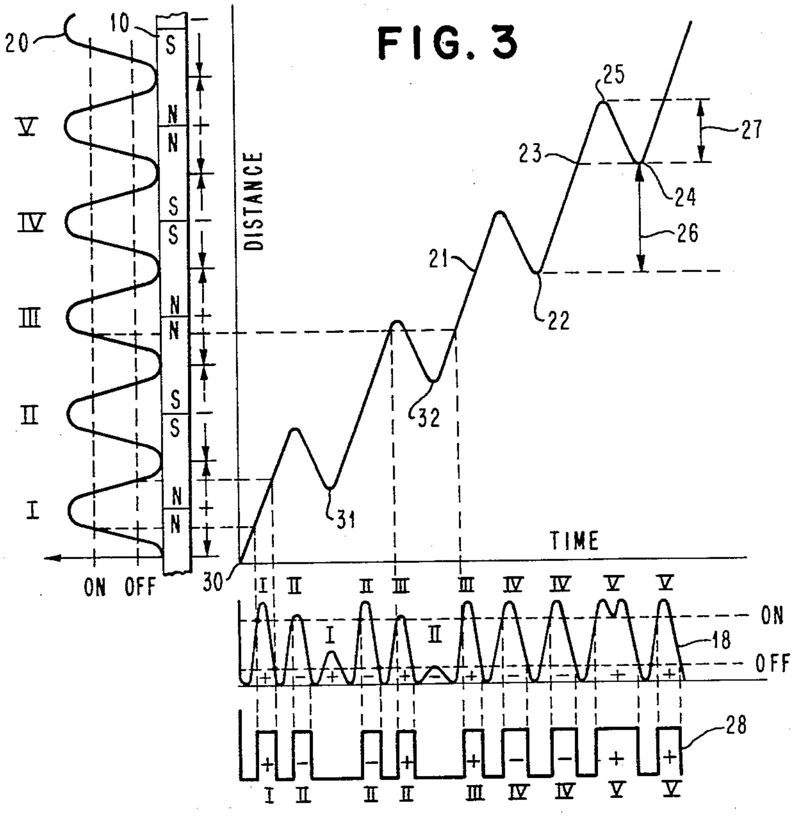
FIGURE 3 is a chart showing relationships between the magnetization of tape, movement of the tape in incrementing steps, and the envelope of the amplitude modulated output signal.

FIGURE 1 is a representation of the static sensing magnetic reproducing head used in connection with this invention. Only so much as is necessary to understand the present invention will be discussed. A series of binary bits in the NRZI manner of recording have been shown. The binary bits are represented by a series of transitions or reversals of the direction of flux emanating from the magnetic tape 10. The tape 10 therefore is made to resemble a series of magnets with North and South poles arranged such that like poles represent a transition of the polarity of magnetic flux emanating from the tape. The magnetic head used for reproduction consists of two outer flux paths 11 and 12 and a center probe 13. The center probe 13 is formed of two members shaped to provide insertion of an excitation winding 14 to which a high frequency excitation signal is applied. The output signal winding 15 is also positioned on the center probe 13 as shown in FIGURE 1.

FIGURE 1 shows the relationship of the reproducing head positioned adjacent the pair of South poles and another view showing a position adjacent a pair of North poles. In the absence of any movement or excitation in the winding 14, a steady state flux represented by the dotted lines will pass from a North pole through the outer legs 11 and 12 up through the center probe leg 13 to the South poles. When the head is positioned adjacent a pair of North poles, the flux will emanate from the North poles down through the center probe leg 13 and up through the two outer legs 11 and 12 back to respective South poles. It can be seen therefore, that depending upon whether the head is adjacent a South or a North pole, the flux introduced to the head will pass through the signal output winding 15 in either of two oposite directions.

It should be noted at this time that the maximum amount of flux threading through the output signal winding is achieved when the center probe 13 is positioned adjacent a flux transition point. If the center probe were midway between a South and North pole, the flux emanating from the North pole of the tape would not pass through the center probe leg but would thread through the two outer legs 11 and 12 and completely bypass the center probe. It can be said therefore, that the reproducing head shown in FIGURE 1 provides a maximum flux passing through the output signal winding when the probe is adjacent the greatest vertical component of flux, and has a minimum when the center probe is sensing flux having a predominantly horizontal component in relation to the tape.

When a high-frequency excitation signal is applied to the winding 14, saturating flux is set up in the center probe 13 on either side of the output signal winding 15. The excitation signal on winding 14 has the effect of providing a periodically varying reluctance in the center prove such that the signal winding 15 will detect a change in flux as a result of the changing reluctance. The excitation on winding 14 is such that the center probe will become saturated on either side of the output signal winding 15 twice for each cycle of the excitation. As a result, an excitation of frequency F will provide an output signal having a frequency 2F. The amplitude of the output signal on winding 15 will be a function of the amount of vertical component flux threading through the head. Further the output signal from winding 15 will not only be amplitude modulated, but will experience a 180° phase reversal dependent on whether or not the head is adjacent South poles or North poles.

FIGURE 2 shows a length of tape 10 again magnetized in accordance with NRZI recording techniques. The waveform 16 represents an output signal from winding 15 of FIGURE 1. This waveform 16 has been exaggerated to show that at the midpoint between two flux transitions on the tape 10, the output signal decreases to a minimum and further experiences a 180° phase reversal. The waveform 17 represents a reference signal which has a frequency twice that of the excitation signal on winding 14 of FIGURE 1. A comparison of the phase of the signal 16 with the reference signal 17 forms a basis for determining when the magnetic flux from the tape has changed in polarity.

Waveform 18 of FIGURE 2 represents an envelope which would result if the output waveform 16 were filtered to remove the high-frequency excitation component. The envelope 18 rises to a maximum amplitude at the flux transition point, or where the like poles of the adjacent magnets of the tape 10 are adjacent. It is the comparison of the phase of the signal 16 with that of the reference 17 in combination with the amplitude of the envelope 18 which forms the basis for the detection system to be discussed.

FIGURE 3 shows certain relationships tied together by ordinants which represent distance and time. Along the distance ordinate is positioned a magnetic tape 10 with a series of flux reversals representing binary transitions or bits I–V The waveform 20 represents the amplitude of the vertical component of flux which is at a maximum at each transition.

The line 21 of FIGURE 3 represents schematically the motion of the tape in relation to time. In an ideal tape incrementing operation, the tape would move from a point such as 22 to the point 23 and stop. The tape would remain at rest until the time 24 at which time the tape would again be incremented.

Because of the inertia of the tape and the incrementing mechanism, the problems of overshoot and falling back of the tape to the detent position are encountered. This is represented by that portion of the waveform 21 which goes from point 23 to point 24 by passing on a distance represented by the point 25. In other words, instead of the tape stopping at point 23 and waiting till the time represented by 24 the tape overshoots the point 23 and goes beyond to the point 25 and then falls back to the point 24. The distance represented by the arrow 26 is the distance the tape should be incremented to conform to the spacing between characters or bits recorded on the tape. The arrow 27 represents the additional distance the tape actually moves because of overshoot.

Below the time ordinate of FIGURE 3 is the envelope 18 of the filtered output signal 16 from the output signal winding 15 of FIGURE 1. The plus and minus signs represent the two opposite phases of the carrier wave signal produced from the output winding 15 in FIGURE 1.

The dotted line in FIGURE 3 labeled ON and OFF are predetermined amplitudes of the envelope 18 which are operative to change the stable states of a Schmitt trigger. A Schmitt trigger, known to those skilled in the art, has two stable states. The trigger will change to one stable state when an input signal reaches a first predetermined amplitude and will remain in that stable state until the input falls to a second lower predetermined amplitude. The waveform 28 of FIGURE 3 is representative of a Schmitt trigger output. The operation of the Schmitt trigger in the invention will be discussed later on in connection with FIGURES 4 and 5.

Several conditions can be discussed in connection with FIGURE 3 as the tape is incremented along in several steps. During the step from point 30 to 31, the tape 10 will move past the reproducing head to provide an amplitude modulated carrier signal having an envelope 18 which detects the presence of bits I and II. Bit II will be read and presented to the output device as a result of the overshoot. Bit I with a plus phase and bit II with a minus phase representing a change phase will cause the logic to be discussed later to accept bit II for this step. As the tape falls back to the point 31, the output will fall off from the bit II and actually start to read a portion of bit I again. The second reading of bit I however, does not reach the threshold level of the Schmitt trigger such that there is no output.

Figure 4:
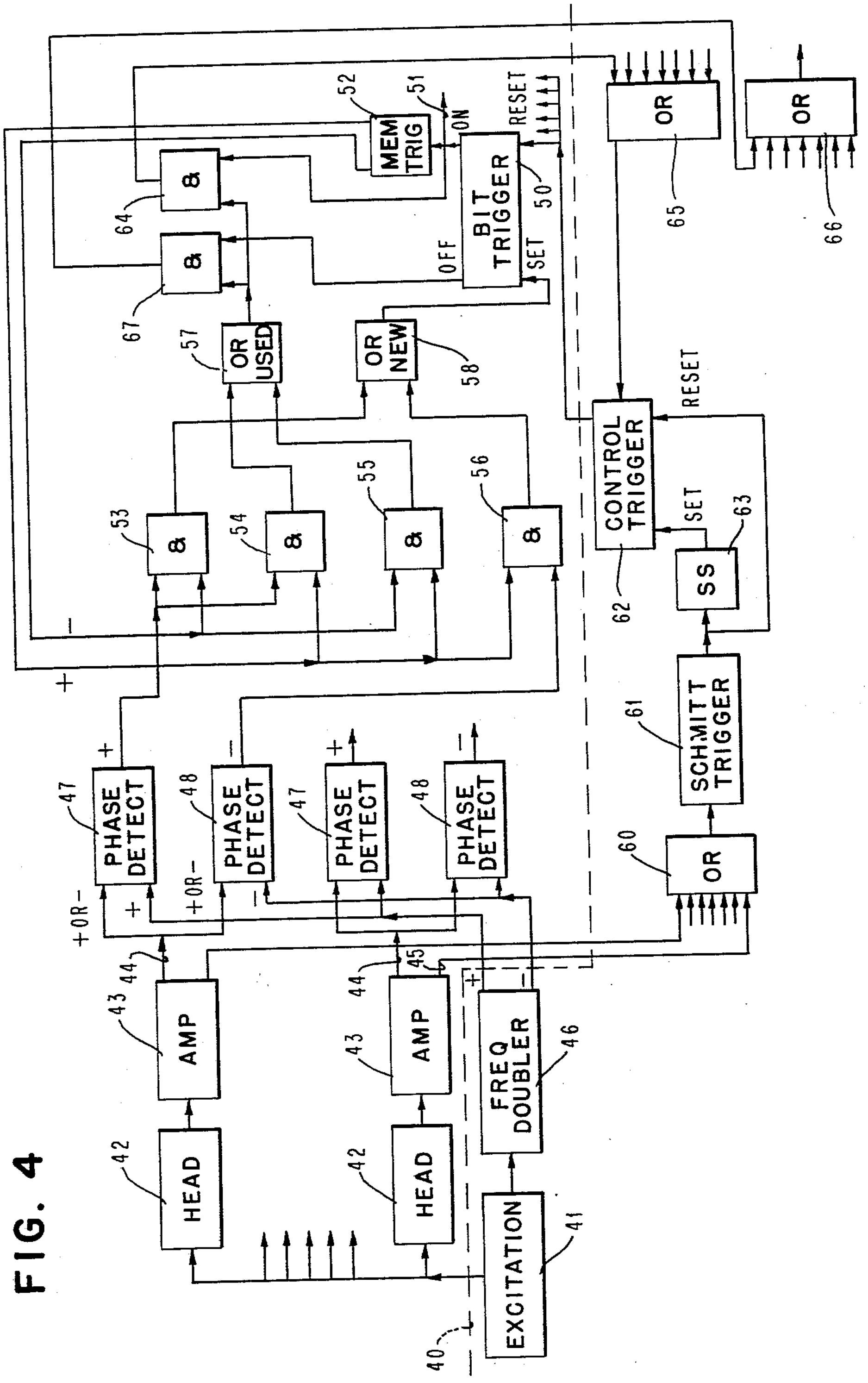
FIGURE 4 is a logic diagram of the data detection system.

During the incrementing of tape from point 31 to point 32, the output of the head will be such that the envelope of bit I will fall to a minimum, bit II will again be read, bit III will be read as a result of overshoot and the tape will fall back to read a portion of bit II again. The logic to be discussed in connection with FIGURE 4 is capable of detecting that during step 31 to 32 the output of the Schmitt trigger for bit II was a second reading and will be rejected because it has the same minus phase as the last bit presented to the output device. During the step 31 to 32 however, bit III will be accepted as a change in phase has occurred. During incrementing of the tape from point 32 to point 22, bit III will again be read and bit IV will be read. During this step, the output 28 of the Schmitt trigger will be rejected for bit III but will be accepted for bit IV.

Figure 5:
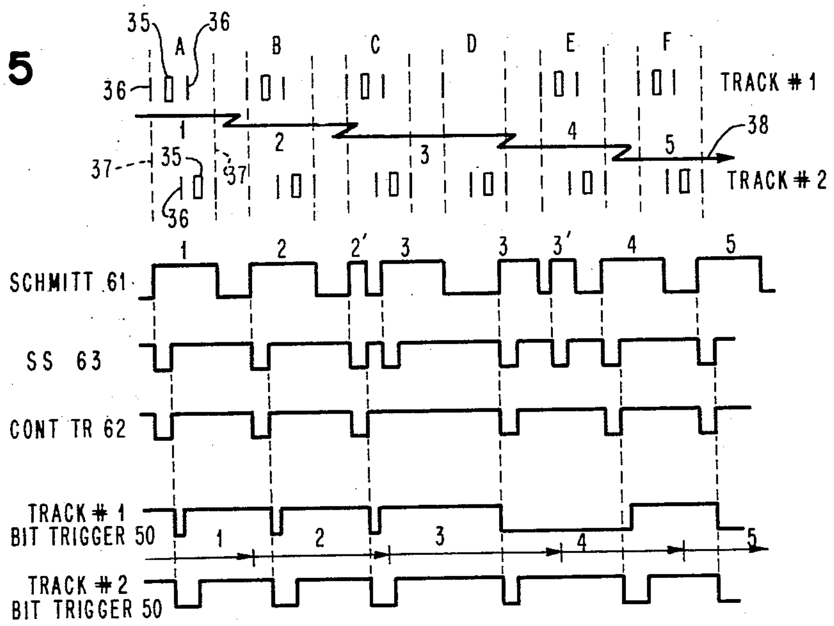
FIGURE 5 is a schematic representation of binary information on a plurality of tracks on a magnetic tape along with certain waveforms generated from logic blocks of FIGURE 4.

Further complications arise when consideration is made for possibility of mechanical skew between bits of a particular character contained in parallel tracks along the tape. In FIGURE 5 there is shown two parallel tracks containing a series of characters A–F. The transition point for a particular bit is represented by the rectangles 35. The solid lines 36 on either side of the rectangles 35 represent the point at which the amplitude of the carrier output signal will reach a value sufficient to switch a Schmitt trigger. If there were no skew, each of the characters and thus the duration of the Schmitt trigger would have a width between the ON and OFF condition for a single bit. Because of skew however, the effective width of the Schmitt trigger and thus a particular character is extended to the distance represented by the dotted lines 37. The line 38 again represents the motion of tape past a reproducing head which has a certain amount of overshoot and falling back to a detent position. In discussing some of the problems encountered in relation to FIGURE 5 during the incrementing steps 1–5, the various bits will be referred to by the character and track number. Thus the designation of bit B1 represents the bit in TRACK 1 of character B.

During increment 1, both bits A1 and A2 are completely read and the overshoot produces no further reading.

During increment 2, both bits B1 and B2 are completely read but because of overshoot, bit C1 is also read. It is to be noted during increment 2 that bit C2 was not read.

During increment 3, bit C1 is read for the second time and bit C2 is read for the first time thus completing character C. Also during increment 3, the tape moves completely through character D providing no output for bit D1 in its absence and an output for bit D2. Because of overshoot, the entire character D is read but the tape falls back into the bit D2. Bit D2 must therefore be rejected during this overshoot condition.

During increments 4, and 5, the tape steps through characters E and F respectively providing no overshoot problem. Before discussing the remainder of FIGURE 5, the logic of the detection system shown in FIGURE 4 will be discussed and the manner in which the above conditions are recognized will be shown.

FIGURE 4 shows the logic required to recognize the various problems mentioned in connection with FIGURE 5. There is shown in FIGURE 4 a multi-track recording system wherein the logic is completely shown for one track, and partially shown for a second, located above the dotted line 40 and those components common to all of the tracks is shown below the dotted line 40.

An excitation source 41 applies the high frequency excitation signal to winding 14 of each of the tracks of a multi-track head. Each head 42 has associated therewith an amplifier 43 which receives the output signal from winding 15 of each of the tracks of the multi-track head. The input to each of the amplifiers 43 is the amplitude modulated carrier wave signal 16 shown in FIGURE 2. Output 44 from each of the amplifiers 43 is an unfiltered signal 16 which will have a phase dependent upon the magnetization in the associated track for that amplifier. Output 45 from each of the amplifiers 43 is a filtered signal represented by the envelope 18 in FIGURE 2 which rises to a maximum value at each of the transition points of the flux and falls to a minimum intermediate the flux transitions.

The output from the excitation source 41 is applied to a frequency doubler 46 to provide complementary plus and minus phase output signals at twice the excitation frequency to be utilized as a reference for determining the phase of the carrier wave signal from each of the heads 42. Phase detectors 47 and 48 for each of the tracks receive the complementary outputs from the frequency doubler 46. Output 44 from each of the amplifiers 43, which may be either a plus or minus phase, is applied to the corresponding pair of phase detectors 47 and 48. Phase detector 47 or 48 will produce a logic output indicating that the phase of the carrier wave signal is in phase or out of phase with the plus or minus reference signal from the frequency doubler 46.

Each of the tracks has associated therewith a bistable bit trigger 50 which serves as the output device for each of the tracks. In a manner to be more fully described later, the bit trigger 50 is set on when a new phase has been detected and reset off when a complete character has been read. Whenever the bit trigger 50 changes from the reset to the set stable state, an output pulse is generated on line 51 indicating the detection of a binary bit.

Associated with each track is a phase memory trigger 52 having two stable states and a binary input causing it to be set on and off alternately each time the associated bit trigger 50 is set on. The phase memory trigger 52 for each of the tracks provides an indication as to which of the two opposite phases of the carrier wave signal caused the associated bit trigger 50 to be changed from the reset to the set condition. By means not shown, each of the memory triggers 52 is initially reset to the off condition providing an indication of the minus phase. All of the bits of the first character in a series of characters is recorded to produce a positive phase of the carrier wave signal, thus providing a starting point for the proper detection of phase changes.

Identification of a change in phase (NEW) or the continued existence of a phase which last set the bit trigger 50 (USED) is accomplished by AND circuits 53–56 and OR circuits 57 and 58. Detection of a positive phase from phase detector 47 is applied to AND circuits 53 and 54. Detection of a negative phase from phase detector 48 is applied to AND circuits 55 and 56. The output of memory trigger 52 which indicates that bit trigger 50 was last set by a positive phase signal is applied to AND circuits 54 and 56. The output of memory trigger 52 which indicates that bit trigger 50 was last set by a negative phase signal is applied to AND circuits 53 and 55.

A first signal, indicating a change in phase (NEW), will be generated from OR circuit 58 and a second signal, indicating the continued existence of the same phase (USED) which last set bit trigger 50, will be provided from OR circuit 57. Whenever bit trigger 50 is in the reset condition and a signal is generated from OR circuit 58 indicating a new phase, bit trigger 50 will be changed to the on stable state by the set input from OR circuit 58.

A gating pulse, or character gate, normally effective to indicate when a complete character has been read, is generated from an OR circuit 60 and Schmitt trigger 61. The Schmitt trigger 61 generates a gating pulse such as waveform 28 in FIGURE 3 but instead of being responsive to only a single track, is responsive to the filtered carrier wave signal from all of the tracks. The FIGURE 2 waveform 18, which is the filtered, amplitude modulated signal resulting from the output winding 15 in FIGURE 1 from each of the amplifiers 43 is applied to OR circuit 60. The Schmitt trigger 61 will switch to the second stable state whenever any one of the signals on line 45 reachs a first predetermined amplitude. The Schmitt trigger 61 will remain in this stable state so long as any one of the signals on line 45 remains above the second lower predetermined amplitude. Schmitt trigger 61 thus provides a gating pulse having a leading edge corresponding to the first predetermined amplitude from any one of the amplifiers 43 and has a trailing edge which corresponds to the second lower predetermined amplitude from all of the amplifiers 43.

A control pulse is normally generated from a control trigger 62. The leading edge of the gating pulse from Schmitt trigger 61 is normally effective to reset control trigger 62, and the leading edge of the gating pulse from Schmitt trigger 61, delayed by the action of a single shot 63, will set the control trigger 62. Each time the control trigger 62 is changed from the reset to the set stable state, the output pulse is effective to cause the bit trigger 50 of all of the tracks to be reset.

The operation just described is sufficient to identify when a complete character has been received but is not capable of identifying the situation as depicted in connection with steps 2 and 3 in FIGURE 5. During step 2 in FIGURE 5, the gating pulse from Schmitt trigger 61 would be generated for character B and return to its normal stable state. Because of overshoot at the end of step 2 however, a gating pulse will be generated as the result of reaching the first predetermined level in track 1 for bit C1. When the tape falls back to the detent position, the gating pulse will fall. When step 3 occurs, the gating pulse from Schmitt trigger 61 will again be initiated by bit C1. The fact that this is the second reading of bit C1 and that bit C2 has not yet been read must be recognized to inhibit the normal action of control trigger 62 from resetting the bit triggers 50 until bit C2 has actually been entered in its corresponding bit trigger 50.

To recognize the above situation, each of the tracks has associated therewith an AND circuit 64. AND circuit 64 for each of the tracks recognizes a condition where the bit trigger 50 has been turned on to enter a binary bit and that the same phase which turned the bit trigger 50 on is still detected for the associated track as a result of the output from OR circuit 57. The outputs from AND circuit 64 from all of the tracks are combined at an OR circuit 65. The output of OR circuit 65 is applied to the control trigger 62 to inhibit or prevent control trigger 62 from being reset by the leading edge of the gating pulse from Schmitt trigger 61. This has the effect of recognizing that the output from the Schmitt trigger 61 is a gating pulse from a bit which has already been read and that additional bits must be read to complete the character.

In connection with FIGURE 5 and step 3, the gating pulse generated for the second time by bit C1 will be recognized as a used bit and will inhibit the normal resetting of control trigger 62. As soon as bit C2 has been entered into its corresponding bit trigger 50, the gating pulse from Schmitt trigger 61 falls and rises again with the detection of the predetermined amplitude of bit D2. The normal operation of control trigger 62 will be allowed and all of the bit triggers 50 will be reset to accept the bits from character D. It should be noted at this time that phase detection must be more sensitive than the Schmitt trigger 61. The fact that there is a used bit or the continued existence of a phase must be recognized before the generation of the gating pulse from Schmitt trigger 61 in order that OR circuits 65 will be energized to inhibit resetting of control trigger 62.

An OR circuit 66, common to all of the tracks, is energized by an AND circuit 67 associated with each of the tracks. AND circuits 67 are energized whenever the continued existence of a phase is detected from OR circuit 57 but the bit trigger 50 is in the off condition. OR circuit 66 thus produces an error signal which indicates a bit for a particular track has been missed. If a new phase from a flux transition is not detected thus failing to set the bit trigger 50, the memory trigger 52 will not be changed and the next phase detected for the following transition will be the same as that indicated by the memory trigger 52. Since it is a characteristic of NRZ recording that successive bits in a track must be of opposite polarity, this is an error condition which can be recognized by the system to cause a machine halt or other corrective measure.

The waveforms shown in FIGURE 5 depict the action of certain of the components shown in FIGURE 4 for various incrementing situations. During step 1, the gating pulse is generated from Schmitt trigger 61 and has a duration equal to the time that it takes the tape to step completely through character A. The leading edge of the gating pulse from Schmitt trigger 61 is delayed by the single shot 63. The leading edge of the gating pulse resets control trigger 62, and sets the control trigger after having been delayed by the single shot 63. When the control trigger 62 is set, the bit trigger 50 of both tracks 1 and 2 are reset. When the new phase has been detected for each of the bits of character A, the information is entered into the bit triggers 50.

At the start of step 2, the gating pulse is generated from Schmitt trigger 61 causing the control trigger 62 to be reset and set in the normal fashion. At the time control trigger 62 is set, the bit triggers 50 from each of the tracks is reset to await entry of bits from character B. At the end of step 2, because of overshoot, a gating pulse labeled 2′ will be generated because of reading bit C1. The leading edge of this pulse will be utilized to reset and set the control trigger 62 to reset the bit triggers 50 for each of the tracks. This clears character B from bit triggers 50 and inserts bit C1 in TRACK 1 bit trigger 50.

At the beginning of step 3, AND circuit 64 of FIGURE 4 will be energized for the track 1. Even though the gating pulse from Schmitt trigger 61 is generated at the start of step 3, the leading edge of the gating pulse will not be effective to reset control trigger 62 as OR circuit 65 will be energized to inhibit reset of control trigger 62. As a result, the information entered into the bit trigger 50 for track 1 at the end of step 2 will not be reset. Bit C2 will be entered in its corresponding bit trigger 50. During the second half of step 3, the gating pulse will again be generated from Schmitt trigger 61 as a result of reading the predetermined amplitude from bit D2. The leading edge of this gating pulse will be effective to reset and set control trigger 62 as AND circuit 64 will not be energized for any of the tracks. At the end of step 3, the output of the Schmitt trigger 61 will fall but will again produce a leading edge as a result of the tape falling back into bit D2 generating a gating pulse as a result of the overshoot. Although the single shot 63 is caused to time out, the bit trigger 50 for bit D2 will be on and the same phase will be detected energizing AND circuit 64 for bit D2 which will inhibit the resetting of control trigger 62 thus preventing reset of all of the bit triggers 50.

Bit D1 is shown to be missing a flux transition thus bit trigger 50 for track 1 will not receive a new phase signal to cause it to be set, and will remain in the reset condition for character D.

When step 4 occurs, the gating pulse from Schmitt trigger 61 will fall and again rise when bit E1 is detected. The rise of the gating pulse for step 4 provides a normal operation in which control trigger 62 is reset and set causing all of the bit triggers 50 to receive a reset pulse clearing character D.

It can be seen in FIGURE 5 that the combination of Schmitt trigger 61, single shot 63 and control trigger 62 dictate when a complete character has been read. The ultimate indication of this is when control trigger 62 is caused to be reset and then set.

Another problem encountered can be seen in connection with step 2 in FIGURE 5. During step 2, bits B1 and C1 must be set into bit trigger 50 for that track. As mentioned previously each time bit trigger 50 is set the output 51 is generated to an output device. While it has not been shown in connection with this invention, a three-character buffer responsive to the output of bit trigger 50 may be included. The three-character buffer has associated therewith a read in counter. The read in counter will be stepped to indicate the next buffer position to receive a character as a result of the generation of the control pulse from control trigger 62 as this indicates when a complete character has been read and that a new character will be received. Logic must be provided in connection with the three-character buffer and the tape incrementing logic to insure that at least two buffer positions are empty in order that two successive characters may be received during one incrementing step. The device which is accepting characters from the tape and dictating when the characters are required will receive the characters correctly from the three-character buffer in a sequence dictated by a read out counter. A comparison of the read out counter and read in counter for the buffer will provide the necessary indication as to when the buffer has two positions available to accept characters.

There has thus been shown in this invention a data detection device which can be used with a periodically incremented tape transport eliminating the need for a large capacity buffer to compensate for time differences between the tape unit and a utilization device. Because of the incrementing fashion in which the tape is moved, overshoot and fall back problems occur requiring indication when certain bits have been read for the second time or when bits are being read from a character already partially read. This has been accomplished by logic which detects not only the phase of a carrier wave signal but also an amplitude of the signal to thus generate signals indicating when either partial or complete characters have been read.

While the invention has been particularly shown and described with reference to a preferred embodiment thereof, it will be understood by those skilled in the art that the foregoing and other changes in form and details may be made therein without departing from the spirit and scope of the invention.

What is claimed:

1. A reproducing system for NRZ magnetic recordings of binary information wherein binary information is represented by transitions of magnetic flux from one polarity to the opposite polarity and further where the record member is transported past a reproducing head comprising:

means for deriving a carrier wave electrical signal from said head having an amplitude and one of two opposite phases dependent on the polarity of the magnetization on said tape, means for detecting the phase of said carrier wave, means responsive to a predetermined amplitude of said carrier wave signal for developing a control pulse, bistable output means having first and second stable states normally responsive to said control pulse for changing from the first to the second stable state and responsive to a detected change in phase from said phase detecting means for changing from the second to the first stable state, and means responsive to the first stable state of said output means and detection by said phase detecting means of the same phase which last produced the first stable state of said output means for inhibiting the change to the second stable state of said output means by said control pulse means.

2. A reproducing system for magnetic tape recordings of binary information wherein binary information is represented by transitions of magnetic flux from one polarity to the opposite polarity and further where the tape is transported past a reproducing head comprising:

means for deriving a modulated carrier wave electrical signal from said head having an amplitude and one of two opposite phases dependent on the polarity of the magnetization on said tape, means for detecting the phase of said carrier wave, means responsive to a predetermined amplitude of said carrier wave signal for developing a control pulse, and output means responsive to said control pulse and said phase detecting means for producing a signal from said output means when said phase detecting means detects a change in phase of said carrier wave signal.

3. A multi-track reproducing system for magnetic tape recordings of plural bit binary characters wherein the binary bits of a character are represented by transitions of magnetic flux from one polarity to the opposite polarity in one or more adjacent tracks across the tape and further where the tape is transported past a multi-track reproducing head comprising:

means for deriving a carrier wave electrical signal from each track of said head having an amplitude and one of two opposite phases dependent on the polarity of the magnetization of a corresponding track on said tape, means for detecting the phase of said carrier wave for each of said tracks, means responsive to a predetermined amplitude of said carrier wave signal from any one of said tracks for developing a control pulse, and output means for each of said tracks responsive to said control pulse and said corresponding phase detecting means for producing a signal from said output means when said phase detecting means detects a change in phase of said carrier wave signal.

4. A multi-track reproducing system for NRZ magnetic recordings of plural bit binary characters wherein the binary bits of a character are represented by transitions of magnetic flux from one polarity to the opposite polarity in adjacent tracks across the record member and further where the record member is periodically stepped past a multi-track reproducing head a distance substantially equal to the interval between characters comprising:

means for deriving a carrier wave electrical signal from each track of said head having an amplitude and one of two opposite phases dependent on the polarity of the magnetization of a corresponding track on said tape.

means for detecting the phase of said carrier wave for each of said tracks, means responsive to a predetermined amplitude of said carrier wave signal from any one of said tracks for developing a control pulse, a plurality of bistable output means, one for each of said tracks, having first and second stable states normally responsive to said control pulse for changing from the first to the second stable state and responsive to a detected change in phase from a corresponding one of said phase detecting means for changing from the second to the first stable state, and means responsive to the first stable state of said output means and detection by the associated one of said phase detecting means of the same phase which last produced the first stable state of said output means, from any of said tracks, for inhibiting the change to the second stable state of all said output means by said control pulse means.

5. A reproducing system for NRZ magnetic tape recordings of binary information wherein binary information, spaced at predetermined intervals, is represented by transitions of magnetic flux from one polarity to the opposite polarity and further where the tape is stepped past a reproducing head a distance substantially equal to said predetermined interval comprising:

means for deriving a carrier wave electrical signal from said head having an amplitude and one of two opposite phases dependent on the polarity of the magnetization on said tape, means for detecting the phase for said carrier wave, bistable output means having a set and reset stable state, said set stable state being indicative of the detection of a change in phase of said carrier wave, means responsive to a predetermined amplitude of said carrier wave signal for developing a control pulse normally operative to reset said output means, memory means, responsive to the change of said output means to the set stable state for indicating which one of the phases of the carrier wave caused said output means to be set, phase identifying means, responsive to said phase detector and said memory means for providing a first signal indicating detection of a change in phase and a second signal indicating the continued detection of the same phase which last set said output means, said first signal being operative to change said output means to the set stable state, and means responsive to the set stable state of said output means and said second signal of said identifying means for inhibiting the reset of said output means by said control pulse.

6. A multi-track reproducing system for NRZ magnetic tape recordings of plural bit binary characters wherein the binary bits of a character are represented by transitions of magnetic flux from one polarity to the opposite polarity in adjacent tracks across the tape and further where the tape is periodically stepped past a multi-track reproducing head a distance substantially equal to the interval between characters comprising:

means for deriving a carrier wave electrical signal from each track of said head having one of two opposite phases dependent on the polarity of the magnetization of a corresponding track on said tape, and an amplitude which rises to a maximum when said head is adjacent said transition and falls to a minimum intermediate said transitions, means for detecting the phase of said carrier wave for each of said tracks, a plurality of bistable output means, one for each of said tracks, having a set and reset stable state, said set stable state being indicative of the detection of a change in phase of said carrier wave for the corresponding track, pulse generating means, responsive to the carrier wave signal from all said tracks for developing a gating pulse having a leading edge corresponding to a first predetermined amplitude of said carrier wave from *any* of said tracks and a trailing edge corresponding to a second lower predetermined amplitude of the carrier wave signal from all said tracks, means delaying the leading edge of said gating pulse, means responsive to the delayed leading edge of said gating pulse for developing a control pulse normally operative to reset all of said output means, a plurality of memory means, responsive to the change of a corresponding one of said output means to the set stable state for indicating which one of the two opposite phases of the carrier wave caused said output means to be set, a plurality of phase identifying means, one for each of said tracks, responsive to a corresponding one of said phase detectors and a corresponding one of said memory means for providing a first signal indicating detection of a change in phase and a second signal indicating the continued detection of the same phase which last set said corresponding output means, said first signal being operative to change said output means from the reset stable state to the set stable state, and means responsive to the set stable state of said output means and said second signal from the associated one of said identifying means, from any of said tracks, for inhibiting the generation of said control pulse.

7. A reproducing system for NRZ magnetic tape recording tape recordings of binary information wherein binary information, spaced at predetermined intervals, is represented by transitions of magnetic flux from one polarity to the opposite polarity and further where the tape is periodically stepped past a reproducing head a distance substantially equal to said predetermined interval comprising:

means for deriving a carrier wave electrical signal from said head having an amplitude and one of two opposite phases dependent on the polarity of the magnetization on said tape, means for detecting the phase of said carrier wave, bistable output means having a set and reset stable state, said set stable state being indicative of the detection of a change in phase of said carrier wave, means responsive to a predetermined amplitude of said carrier wave signal for developing a control pulse normally operative to reset said output means, memory means, responsive to the change of said output means to the set stable state for indicating which one of the phases of the carrier wave caused said output means to be set, phase identifying means, responsive to said phase detector and said memory means for providing a first signal indicating detection of a change in phase and a second signal indicating the continued detection of the same phase which last set said output means, said first signal being operative to change said output means to the set stable state, means responsive to the set stable state of said output means and said second signal of said identifying means for inhibiting the reset of said output means by said control pulse, and means responsive to the reset stable state of said output means and said second signal of said identifying means for providing an error signal.

8. A multi-track reproducing system for NRZ magnetic tape recordings of plural bit binary characters wherein the binary bits of a character are represented by transitions of magnetic flux from one polarity to the opposite polarity in adjacent tracks across the tape and further where the tape is periodically stepped past a multi-track reproducing head a distance substantially equal to the interval between characters comprising:

means for deriving a carrier wave electrical signal from each track of said head having one of two opposite phases dependent on the polarity of the magnetization of a corresponding track on said tape, and an amplitude which rises to a maximum when said head is adjacent said transition and falls to a minimum intermediate said transitions, means for detecting the phase of said carrier wave for each said tracks, a plurality of bistable output means, one for each of said tracks, having a set and reset stable state, said set stable state being indicative of the detection of a change in phase of said carrier wave for the corresponding track, pulse generating means, responsive to the carrier wave signal from all said tracks for developing a gating pulse having a leading edge corresponding to a first predetermined amplitude of said carrier wave from any of said tracks and a trailing edge corresponding to a second lower predetermined amplitude of the carrier wave signal from all said tracks, means delaying the leading edge of said gating pulse, means responsive to the delayed leading edge of said gating pulse for developing a control pulse normally operative to reset all of said output means, a plurality of memory means, responsive to the change of a corresponding one of said output means to the set stable state for indicating which one of the two opposite phases of the carrier wave caused said output means to be set, a plurality of phase identifying means, one for each of said tracks, responsive to a corresponding one of said phase detectors and a corresponding one of said memory means for providing a first signal indicating detection of a change in phase and a second signal indicating the continued detection of the same phase which last set said corresponding output means, said first signal being operative to change said output means to the set stable state, means responsive to the set stable state of said output means and said second signal from the associated one of said identifying means, from any of said tracks, for inhibiting the generation of said control pulse, and means responsive to the reset stable state of said output means and said second signal from the associated one of said identifying means, from any of said tracks, for providing an error signal.

No references cited.